United States Patent [19]

Marchant

[11] 3,864,327

[45] Feb. 4, 1975

[54] REMOVAL OF MERCURY FROM SOLUTIONS

[75] Inventor: Wayne N. Marchant, Sparks, Nev.

[73] Assignee: The United States of America as represented by the Secretary of the Interior, Washington, D.C.

[22] Filed: Sept. 19, 1973

[21] Appl. No.: 398,908

[52] U.S. Cl. ................ 260/231 A, 210/24, 252/426
[51] Int. Cl. ............................................. C08b 21/34
[58] Field of Search ............ 260/231 A, 233, 231 R; 252/426

[56] References Cited
UNITED STATES PATENTS

| | | | |
|---|---|---|---|
| 2,136,296 | 11/1938 | Hardy | 260/231 A |
| 2,232,927 | 2/1941 | Peterson et al. | 260/231 R |
| 2,418,939 | 4/1947 | Izard | 260/231 A |
| 3,484,390 | 12/1969 | Bauman et al. | 260/2.2 |
| 3,719,473 | 3/1973 | Waiss et al. | 210/24 |
| 3,725,261 | 4/1973 | Friedman | 210/38 |

OTHER PUBLICATIONS

Reid, Organic Chemistry of Bivalent Sulfur, Volume I, Chemical Publishing Co., Inc., N.Y., N.Y., 1958, Pages 15—23.

*Primary Examiner*—Ronald W. Griffin
*Attorney, Agent, or Firm*—William S. Brown

[57] ABSTRACT

Mercury is removed from aqueous solution by contacting the solution with an absorbent prepared by incorporating vicinal thiol groups into a cellulose matrix.

5 Claims, No Drawings

REMOVAL OF MERCURY FROM SOLUTIONS

Removal of mercury from waste solutions has become important from the standpoint of environmental protection. It has been removed by precipitation, either by addition of a metal sulfide to form the insoluble mercuric sulfide, or by addition of alkali to form a mercury oxide. It has also been precipitated as the free metal by addition of metallic zinc or sodium borohydride. However, all of these methods suffer from the disadvantage that they involve replacement of the dissolved mercury by another pollutant, e.g., sodium, calcium, zinc, etc. In addition, the precipitating or reducing agent must usually be added in an amount exceeding the quantity of mercury present to insure maximum removal of mercury, the net effect being to increase the concentration of dissolved chemicals.

Ion exchange and solvent extraction procedures have also been employed for removal of dissolved mercury, but such processes generally have the disadvantage of requiring substantial capital investment.

It has now been found, according to the invention, that mercury may be efficiently and economically removed from solution, without introduction of other pollutants, by treating the solution with a modified cellulose adsorbent having vicinal thiol groups grafted on the cellulose matrix. This absorbent is highly selective for mercury, is independent of pH over a range of about 1 to 9 and is effective in acidic brine.

The adsorbents employed in the invention are novel per se and are prepared by incorporation of vicinal thiol groups, i.e., thiol groups on adjacent carbon atoms, into cellulose. The resulting adsorbent will, for convenience, be referred to as VDT cellulose, i.e., vicinal dithiol cellulose. The method employed in preparation of the VDT cellulose is not critical and various conventional reactions may be employed. Exemplary of these is the following series of reactions:

1. Alkaline cellulose, prepared by allowing cellulose to swell in strong alkali, is reacted with allyl bromide according to the following equation, where R is the cellulose residue:

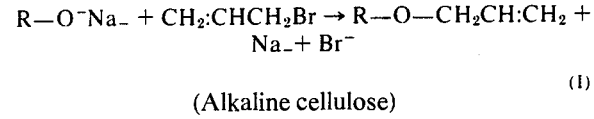

(Alkaline cellulose)

2. Product (I) is then reacted with bromine according to the equation:

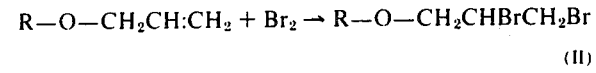

3. Product (II) is reacted with a hydrosulfide, e.g., NaSH or KSH, according to the equation:

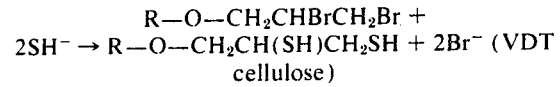

The type and source of the cellulose used in preparation of the adsorbents of the invention is not critical, with cellulose of either wood or cotton origin being suitable. Generally, commercial powdered cellulose, having a particle size of about 100 to 325 mesh, is preferred. However, a pulp prepared from commercial filter paper or shredded newspaper may also be used.

Alkaline cellulose is conventionally prepared by allowing cellulose to swell in strong alkali. This is generally most conveniently accomplished by stirring the alkali solution into the cellulose powder or pulp under ambient conditions of temperature and pressure. Sodium hydroxide is the preferred alkali, but potassium hydroxide may also be employed. Concentration of the alkali solution is suitably about 20% to 40% (W/W), while the amount of alkali solution employed will range from about 2 g to 4 g per gram of cellulose, or as required to provide a consistency suitable for mixing.

The resulting mixture, dry in appearance, is then allowed to stand at a temperature of about 0°C to 5°C, with occasional stirring, for a period of about 30 to 60 minutes, preferably about 30 minutes, to complete the reaction between alkali and cellulose.

As indicated above, the second step in preparation of the adsorbent consists of incorporating an unsaturated hydrocarbon radical into the cellulose by means of a conventional etherification. This is accomplished by reacting the alkaline cellulose with a reactant containing the unsaturated hydrocarbon radical and a reactive substituent such as bromine, chlorine, iodine, epoxide, etc.

The hydrocarbon radical may vary in length, with 3 to 6 carbon atoms being preferred. The unsaturation preferably consists of a single double bond which may occur at any position on the hydrocarbon chain. However, location of the double bond between the terminal carbon atoms generally provides optimum efficiency in the adsorption process.

Specific examples of suitable reactants are allyl bromide, allyl chloride, and allyl glycidyl ether. This reactant is employed in an amount of about 0.5 to 1.5 times the weight of the alkaline cellulose, and the reaction is carried out at a temperature of about 50° to 60°C, for a period of about one-half to 1½ hours. Any conventional reaction vessel may be employed, preferably with occasional stirring. The product is washed with water to remove any excess caustic, and is then dried. Rinsing with an acidic solution, such as dilute hydrochloric acid, may also be employed to neutralize any remaining caustic. Drying may be accomplished in air, or in a vacuum. It is, however, generally preferable to employ an initial rinse with an organic liquid, such as ethanol, ether or acetone to remove most of the water, prior to air drying.

The dry powder resulting from the preceding steps consists essentially of an etherified cellulose corresponding to product (I) in the above equations. This product is then brominated by conventional procedures. Typically, it is slurried in a suitable organic diluent, such as carbon tetrachloride, tetrachloroethylene, or glacial acetic acid, the amount of solvent being sufficient to permit efficient stirring. This will usually require about 10 ml to 15 ml of solvent per gram of the etherified cellulose. Liquid bromine is then added in an amount about 0.5 to 2.0 times the weight of the etherified cellulose, and the slurry is stirred at room temperature for a period of about 2 to 4 hours. The product is recovered by filtration, washed with the diluent to remove excess bromine and dried as above.

The resulting dry product consists of a brominated compound corresponding to product (II) in the above equations. This compound is then reacted with a solution of sodium or potassium hydrosulfide, again by means of conventional procedures. The hydrolsulfide solution is conveniently prepared by dissolving NaOH or KOH in ethanol or methanol, in an amount of about 30 to 80 grams of alkali per liter of alcohol, and saturating the solution with $H_2S$.

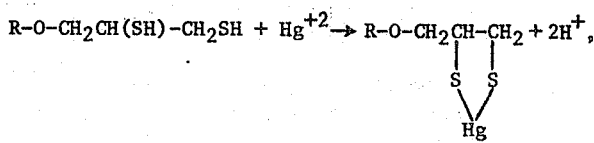

although the reaction

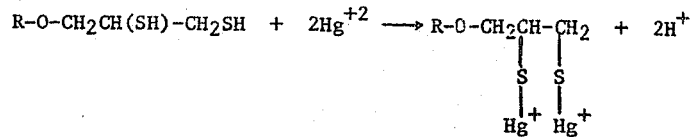

The dried brominated compound is added to the hydrosulfide solution in an amount of about 40 to 100 grams per liter of solution, and the resulting slurry is stirred for about 1.5 to 20 hours at a temperature of about 25 to 85°C. The product is recovered by filtration, washed with dilute HCl, then with water, to neutrality. It is then dried, as above, by washing with alcohol and ether, followed by air-drying. This product consists of the desired VDT cellulose that constitutes the adsorbent in applicant's invention.

Removal of mercury from the feed solution is accomplished simply by contacting the solution with the VDT cellulose, preferably in essentially powder form, for a time sufficient to permit adsorption of the desired amount of mercury by the VDT cellulose. This may be accomplished by any conventional method for contacting liquids with solid sorbents, e.g., batchwise operations. These comprise addition of the sorbent to the feed solution, followed by thorough mixing for a time sufficient to permit maximum contact between adsorbent and solution. The spent adsorbent is then separated from the solution by conventional means such as filtering. Optimum amounts of adsorbent and contacting time may vary considerably depending on the specific types and amounts of constituents in the solution, and on the specific adsorbent employed and are best determined empirically. However, about 2 to 30 grams of adsorbent per liter of solution, and a contact time of about 20 to 120 minutes, is usually satisfactory. The presence of other metal ions, such as ferric, cupric, calcium, lead, cadmium, magnesium and silver, do not significantly interfere with removal of mercury by the VDT cellulose. In addition, it is effective over a wide range of pH, i.e., about 1 to 9, and in the presence of high concentrations, i.e., up to about 4 moles per liter, of salts such as sodium chloride.

Alternatively, a fixed bed operation may be employed. This typically involves the use of a vertical columnar unit containing a bed of the sorbent particles in a closely packed and relatively fixed arrangement. The feed solution is introduced at the top of the column and flows downwardly through the adsorbent bed at a rate that provides for adequate contact between solution and adsorbent. Optimum flow rate will depend on the above variables, as well as the particle size of the adsorbent and the diameter and depth of the bed, and is again, best determined empirically.

Although the process by which mercury is removed from solution by the VDT cellulose of the invention has been referred to in the above description as "adsorption," the actual mechanism is believed to involve formation of a covalent sulfur-mercury bond according to the following reaction:

may also take place at high mercury concentration.

The invention will be more specifically illustrated by the following examples.

EXAMPLE 1

This example describes a specific embodiment of the preparation of the VDT cellulose adsorbent of the invention.

Alkaline cellulose was prepared by stirring a solution consisting of 35 grams NaOH in 150 ml of water into 50 grams of powdered cellulose. The resulting mixture, dry in appearance, was allowed to stand in an ice bath for 30 minutes, with occasional mixing, then transferred to a 60° water bath. Allyl bromide (91 g) was added dropwise with continuous mixing and the mixture was maintained at 60°C for 1¼ hours. The product was washed with water to a pH of about 8, then rinsed with 1 liter of 0.01 normal hydrochloric acid, followed by 100 ml of acetone, and the product was then air-dried for several hours.

15 grams of the dried powder was then slurried with 250 ml of $CCl_4$. 7.3 grams of bromine was added and the slurry was stirred at room temperature for 4 hours. The product was recovered by filtration, washed with 100 ml $CCl_4$, followed by 50 ml of ether, and air-dried overnight.

The brominated product was added to 250 ml of a solution of sodium hydrosulfide prepared by dissolving 20 grams of NaOH in 250 ml of methanol, and saturating the solution with gaseous $H_2S$. The resulting slurry was stirred for 20 hours at a temperature of 75°C and the product recovered by filtration. It was washed with 200 ml of 0.01 normal hydrochloric acid, then with water to neutrality, followed by washing with 50 ml of methanol, 50 ml of ether and air-drying for several hours to yield the VDT cellulose in the form of a powder.

EXAMPLE 2

In this example, VDT cellulose prepared as in Example 1 was used for removal of mercury from aqueous solution by means of a batchwise procedure. 190 mg of the VDT cellulose was added to 6.0 ml of a $^{203}$Hg-labeled mercuric nitrate solution ($7 \times 10^{-3}$ M in $Hg^{+2}$). The mixture was stirred at room temperature for 20 minutes, after which it was filtered. The filtrate (5.0 ml) was counted in a well-type NaI(Tl) scintillation counter and compared with 5.0 ml of the same $Hg^{+2}$ solution, untreated, counted in the same manner. Results are shown in Table 1.

TABLE 1

| Solution | Net cpm | % Hg removed | Loading of VDT cellulose, gHg/Kg |
|---|---|---|---|
| Untreated | 58,115 | — | — |
| Treated | 2,984 | 95 | 44 |

EXAMPLE 3

1 g of VDT cellulose, prepared as in Example 1, was added to 25 ml of a solution of mixed metal nitrates and stirred at room temperature for 45 minutes, after which the mixture was filtered. The concentrations of the various metals in the filtrate and in the solution before treatment were determined by atomic absorption spectrophotometry. Results are shown in Table 2.

TABLE 2

| Metal | Concentration before treatment (ppm) | Concentration after treatment (ppm) | % removed |
|---|---|---|---|
| Hg | 3,100 | 150 | 95+ |
| Fe | 1,200 | 1,200 | 0 |
| Cd | 500 | 500 | 0 |
| Mg | 380 | 380 | 0 |
| Ag | 2,000 | 1,900 | 5 |

EXAMPLE 4

50 mg portions of VDT cellulose, prepared as in Example 1, were added to 25 ml portions of a solution 0.1 M in NaCl and $1 \times 10^{-4}$ M in $^{203}Hg^{+2}$ (i.e., 20 ppm Hg). The solution pH was rapidly adjusted to the values shown in Table 3 with $HNO_3$ or NaOH as required. After stirring at room temperature for 2 hours, the mixture was filtered and 5.0 ml of filtrate was counted for $^{203}Hg$ determination and compared with 5.0 ml of an untreated standard solution of identical composition to determine the extent of Hg removal. Results are shown in Table 3.

TABLE 3

| Solution pH | % Hg removed | Solution pH | % Hg removed |
|---|---|---|---|
| 1 | 97.0 | 6 | 98.4 |
| 2 | 97.9 | 7 | 98.4 |
| 3 | 98.1 | 8 | 99.3 |
| 4 | 98.1 | 9 | 98.4 |
| 5 | 98.7 | | |

EXAMPLE 5

In this example, VDT cellulose prepared as in Example 1, was used for removal of mercury from aqueous solution by means of a continuous-flow procedure. A solution of $^{203}Hg$-labeled mercuric nitrate at a concentration of 1 ppm was passed through a column 10 mm I.D. × 23 mm long containing 0.5 g of the VDT cellulose at a flow rate of 50 ml/hr. For approximately 60 column volumes the mercury level of the effluent remained below 5 ppb, the limit presently recommended by the U.S. Public Health Service for drinking water.

I claim:

1. An adsorbent for removal of mercury from aqueous solution consisting essentially of a cellulose matrix having grafted thereto a plurality of vicinal dithiol-substituted hydrocarbon radicals.

2. The adsorbent of claim 1 in which the vicinal dithiol-substituted hydrocarbon radicals consist of 2,3-dithiol propyl radicals.

3. A process for preparation of the adsorbent of claim 1 comprising the steps of (1) preparation of alkaline cellulose by reaction of cellulose with strong alkali, (2) reaction of the alkaline cellulose with a reactant consisting of a compound containing a hydrocarbon radical having at least one double bond and a reactive substituent from the group consisting of bromine, chlorine, iodine, and epoxide to incorporate the hydrocarbon radical into the cellulose, (3) bromination of the hydrocarbon radicals, and (4) reaction of the product of step (3) with a hydrosulfide to form vicinal dithiol groups on the hydrocarbon groups.

4. The process of claim 3 in which the reactant of step (2) is allyl bromide.

5. The process of claim 3 in which the reactant of step (2) is allyl glycidyl ether.

* * * * *